United States Patent
Pedrani

[15] 3,683,783
[45] Aug. 15, 1972

[54] AIR CONDITIONING DEVICE FOR MOTOR VEHICLES

[72] Inventor: Giulio Pedrani, via Gouzia 59, Turin, Italy

[22] Filed: March 17, 1971

[21] Appl. No.: 125,039

[30] Foreign Application Priority Data

March 26, 1970 Italy .................... 53095 B/70

[52] U.S. Cl. ................................................. 98/2.07
[51] Int. Cl. ................................................. B60h 1/24
[58] Field of Search ........... 98/2.05, 2.06, 2.07, 2.08, 98/2.17

[56] References Cited

UNITED STATES PATENTS

| | | |
|---|---|---|
| 2,738,718 | 3/1956 | Reynolds .................... 98/2.07 |
| 2,860,567 | 11/1958 | Wilfert ...................... 98/2.06 |
| 2,984,415 | 5/1961 | Wilfert ...................... 98/2.07 |
| 3,387,549 | 6/1968 | De Castelet ................. 98/2.07 |

*Primary Examiner*—Meyer Perlin
*Attorney*—Sughrue, Rothwell, Mion, Zinn & Macpeak

[57] ABSTRACT

An air conditioning device for installation in a vehicle has a moulded casing enclosing a front air intake chamber, an intermediate mixing chamber housing a hot water heater through which a regulatable part of the intake air flows and rear air distribution chamber which distributes conditioned air between upper outlet ducts and a lower, regulated, outlet. Respective control levers controlling flow of hot water through the heater and the flow of air there through are housed in a box located in but effectively sealed from the air distribution chamber.

3 Claims, 2 Drawing Figures

3,683,783

AIR CONDITIONING DEVICE FOR MOTOR VEHICLES

BACKGROUND OF THE INVENTION

This invention relates to air-conditioning devices for motor vehicles.

An object of the invention is to provide an air-conditioning device for motor vehicles which is of simple and compact construction and which is easily assembled.

Another object of the invention is to provide an air-conditioning device as aforesaid which can be located conveniently in the body of a vehicle and which requires only a small number of apertures in a bulkhead of the body for the fitting of the device, preferably without interior draughts being caused by the presence of such apertures.

It is a further object of the invention to provide an air-conditioning device as aforesaid which ensures efficient distribution of air in the passenger or driver's compartment of a vehicle.

SUMMARY OF THE INVENTION

The air-conditioning device according to the present invention comprises a pre-assembled casing adapted to be located between the front compartment and passenger compartment of the vehicle, said casing being formed by interconnected hollow shells and enclosing a front chamber communicating with an air intake, a mixing chamber housing a heater through which hot water or coolant flows, and a motor-driven fan, and an air distribution chamber which communicates with the passenger compartment through a lower opening controlled by a hinged flap and which communicates with air ducts having directionally adjustable nozzles adapted to be located in the vehicle instrument panel, the front chamber being separated from the mixing chamber by a transverse partition having two superimposed openings closable by respective flap doors, one of which openings communicates with the heater, and a box located in and effectively isolated from the air distribution chamber, said box housing two superimposed control levers pivotable about a common vertical axis and projecting into the passenger compartment through respective slots in said box, the said levers being connected to the door cooperating with said one opening and to a tap which controls the flow of water or coolant through the heater.

The invention will be more clearly understood from the following description, given by way of non-limiting example, with reference to the accompanying drawings.

DETAILED DESCRIPTION OF ILLUSTRATED EMBODIMENT

Figure 1:
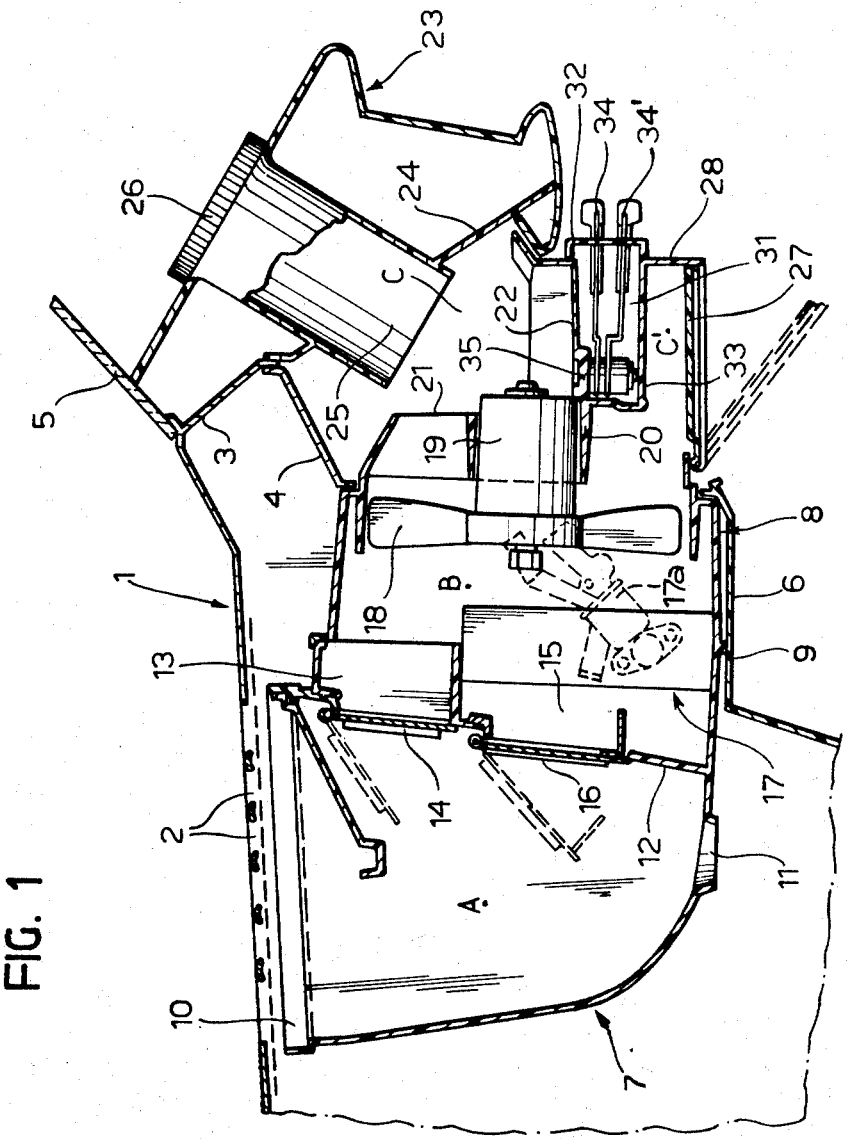
FIG. 1 is a diagrammatic axial section of an air-conditioning device for the passenger compartment of a motor vehicle, according to one embodiment of the invention.

In FIG. 1 an upper cover panel forming part of the front bodywork shell of a motor vehicle is indicated at 1: this part of the vehicle body encloses a front compartment, which usually houses the vehicle engine but which may be used as a luggage boot or trunk. The panel 1 has a number of slits 2 forming an air intake grille. Rearwardly of this grille the panel 1 is connected to a rearwardly inclined front wall 3 of the vehicle passenger compartment, the wall 3 being itself connected to an oppositely inclined wall 4. The lower edge of the vehicle windscreen 5 is located at the junction of the panel 1 and the wall 3.

An air-conditioning device according to the invention is located between the rear end of the front compartment and the front end of the passenger compartment of the vehicle. The air-conditioning device comprises a single preassembled unit enclosed in a casing consisting of a number of hollow shells moulded in plastics material and interconnected. A first shell 7 constitutes the front part of the device and is located in the front compartment of the vehicle body: the shell 7 is connected at its rear end to a second shell 8 which is snap-engaged with the first shell by way of suitably formed interengaging male and female elements 9. The second shell 8 is provided with lateral flanges 37 (FIG. 2) for connection to the vehicle body.

The central part of the air conditioning device rests on a shaped partition which is positioned above the foot pedal controls of the vehicle and which separates the front compartment of the vehicle body from the passenger compartment.

The first shell 7 is shaped to define an upwardly facing air inlet opening 10 which is positioned directly beneath the slits 2 of the cover panel to facilitate the entry of air into a front chamber A of the device, defined between the shell 7 and an intermediate transverse partition 12. The shell 7 is provided with a drain outlet 11 in its lowermost part to permit the drainage from the chamber A of rainwater which may enter the chamber A through the slits 2.

The partition 12 is formed with upper and lower openings 13, 15 respectively, closable by respective flap doors 14, 16 which open towards the chamber A, as indicated in broken outline in FIG. 1. The lower opening 15 places the front chamber A in communication with a mixing chamber B in which a heater 17 is located, so that air entering the chamber B from the opening 15 passes through the heater 17. The heater 17 comprises a heat exchanger which is supplied with hot coolant, usually water, from the engine cooling system. A bladed axial flow fan 18 is positioned behind the heater 17 for drawing air through the latter when driven by an electric motor 19. The motor 19 is carried by a tubular support 20 formed integrally with the second shell 8.

The upper opening 13 in the partition 12 communicates directly with the mixing chamber B and when open allows cold air to pass through the mixing chamber B without passing through the heaters 17.

Thus air entering the mixing chamber B through the upper opening 13 is unheated while air entering the mixing chamber B through the lower opening 15 is heated by the heater 17. By suitably adjusting the degree of opening of the two flap doors 14 and 16 the unheated and heated air can be mixed in any desired ratio in order to regulate the temperature of the air entering the passenger compartment of the vehicle.

The tubular support 20 for the motor 19 is itself supported by a number of radially outwardly projecting axial extending webs 21 which also constitute longitudinal baffles guiding the flow of air from the fan 18 into an upper air distribution chamber C and thence into the passenger compartment of the vehicle. A horizontal wall 22 is connected to the tubular support 20 and located in the air distribution chamber C.

An instrument panel 23 is located in the passenger compartment and extends from the inclined wall 3 of the vehicle body to the rear edge of the shell 8. An internal inclined partition 24, sloping downwardly and rearwardly, extends between the wall 3 and the instrument panel 23, defining the rear end of the upper air distribution chamber C. A number of tubular air ducts 25 (one only of which is shown in FIG. 1) extend in an upward and rearward direction between the interior of the upper air distribution chamber C and the interior of the passenger compartment, each duct 25 being supported by the instrument panel 23 and the internal partition 24. Each duct 25 has at its upper end an air outlet nozzle 26 which is rotatable about the axis of the duct and which is provided with a number of deflector vanes (not shown) so that the air flow from the duct 25 can be directed, by manipulation of the nozzle 26, upwardly towards the windscreen 5 or rearwardly into the passenger compartment.

A lower air distribution chamber C', communicating with the upper chamber C, is located beneath the wall 22. The bottom wall of the lower chamber C' has a lower opening with which a hinged flap 27 cooperates. The flap 27 when open (broken outline) allows air to enter the passenger compartment from the chamber C'.

The lower air distribution chamber C' is closed at its rear end by a vertical wall 28. Two vertical partitions 29, 30 diverge rearwardly and symmetrically and are connected to or integral with the wall 28 at their rear ends. The partitions 29, 30 enclose a sector-shaped box 31 which is closed by an arcuate rear wall 32 and a flat bottom wall 33, the upper wall of the box 31 being formed by the horizontal wall 22. The interior of the box 32 is therefore hermetically separated from the two air distribution chambers C and C'.

Figure 2:
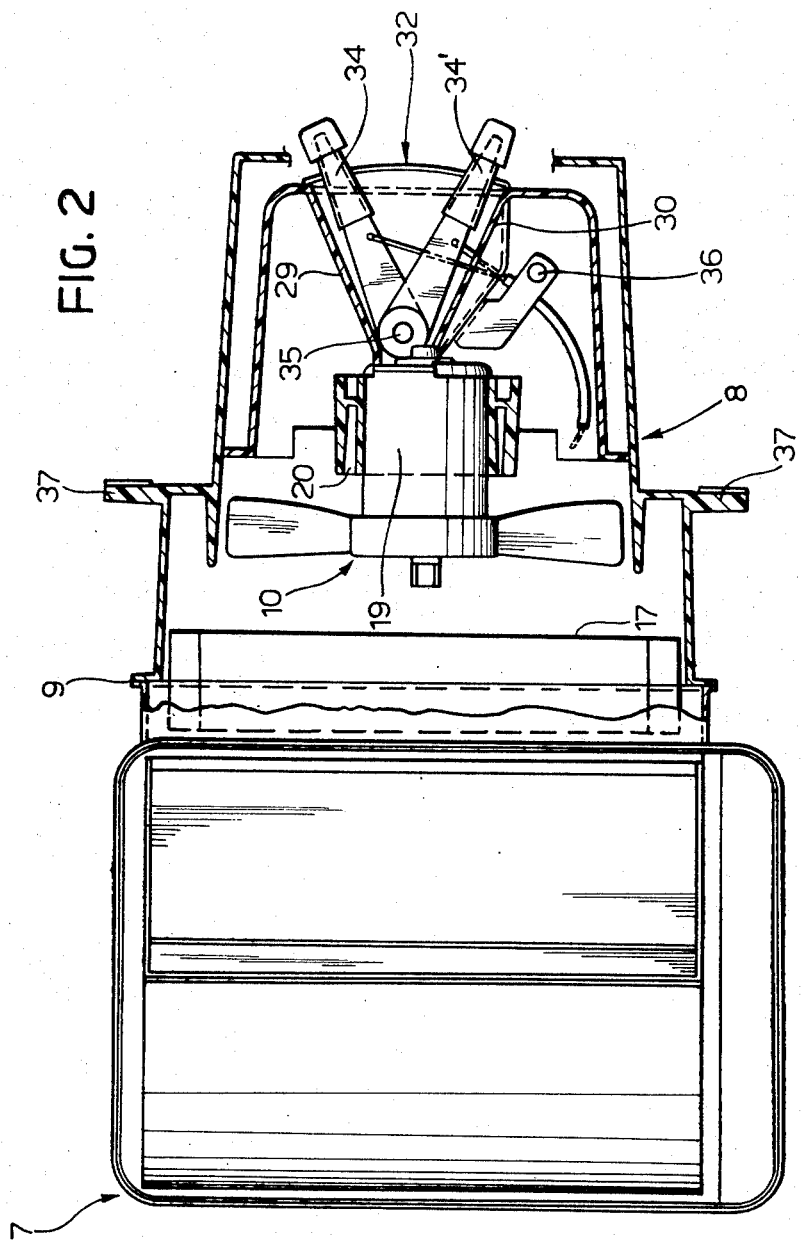
FIG. 2 is a diagrammatic plan view of the device of FIG. 1, partly cut away.

Upper and lower control levers 34, 34' are housed in the box 31 for independent rocking movement about a common vertical pivot pin 35 to control respectively the flap door 16 and a tap 17a (shown in broken outline in FIG. 1) which regulates the flow of hot water or coolant through the heater 17. The two levers 34 and 34' project through slots in the wall 32 and pass through small lateral holes in one of the divergent partitions 30 (FIG. 2). Externally of the box 31 these cables enter respective semi-rigid sheaths in which the cables slide, the ends of the sheath being supported by a bracket 36, or by the lower opening which is closed by the flap 27.

This arrangement in which the box 31 is effectively sealed, avoids cracks and openings through which unheated air could otherwise enter the passenger compartment.

The entire air-conditioning device is assembled before fitting in the motor vehicle. The pre-assembled device incorporates controls for the heater tap 17a and the doors 14, 16, as well as the necessary hose connections for the water or coolant conduit of the heater 17, and the air ducts 25. The fitting of the device to the vehicle does not require the usual boring of holes but simply the fitting of the casing between the front compartment of the vehicle and the passenger compartment, and the fitting of the instrument panel 23 and partition 24 to close the upper air distribution chamber C.

What is claimed is:
1. An air conditioning device for a motor vehicle, comprising:
   a. a pre-assembled casing comprising interconnected hollow shells adapted to be located between the front compartment and passenger compartment of the vehicle;
   b. means within said casing defining a front chamber, a mixing chamber and an air distribution chamber;
   c. an air intake communicating with the front chamber;
   d. a heater, through which hot coolant liquid flows in use of the device, housed in the mixing chamber;
   e. a motor-driven fan in the mixing chamber adjacent the heater;
   f. means defining in the casing a lower opening through which the air distribution chamber communicates with the passenger compartment;
   g. a hinged flap controlling air flow through said lower opening;
   h. a number of air ducts having directionally adjustable nozzles adapted to be located in the vehicle instrument panel, said air ducts communicating with the air distribution chamber;
   i. a transverse partition separating the front chamber from the mixing chamber;
   j. means defining two superimposed openings in said partition;
   k. respective flap doors associated with said openings and controlling air flow therethrough, one of said openings communicating with the heater;
   l. a box located in and effectively isolated from the air distribution chamber;
   m. two superimposed control levers pivotable within said box about a common vertical axis and projecting through respective slots in said box;
   n. a tap controlling the flow of said coolant liquid through the heater; and
   o. means connecting said levers to the door cooperating with said one opening and to said tap.

2. Device according to claim 1, wherein the casing comprises hollow front and rear shells moulded in plastics material, said shells having male and female elements interconnected by snap inter-engagement, the rear shell being provided with lateral flanges by which the casing may be secured to the motor vehicle body.

3. Device according to claim 2, wherein the rear casing shell includes an integral tubular support which carries the fan motor, and further includes a horizontal internal wall, two laterally divergent internal partitions and rear and bottom walls which define said box in which the control levers are housed.

* * * * *